United States Patent [19]

Saracsan et al.

[11] Patent Number: 4,643,794
[45] Date of Patent: Feb. 17, 1987

[54] PRIMER AND SEALANT FOR GLASS AND COATED METAL

[75] Inventors: Jeffrey W. Saracsan, Ashland; Stephen M. Oswalt, Mansfield, both of Ohio

[73] Assignee: Ashland Oil, Inc., Russell, Ky.

[21] Appl. No.: 835,918

[22] Filed: Mar. 4, 1986

[51] Int. Cl.$^4$ .............................................. B32B 7/00
[52] U.S. Cl. .................................... 156/310; 52/208; 156/108; 156/315; 156/331.4; 428/423.3; 428/423.7; 525/440; 528/60
[58] Field of Search ............ 156/108, 315, 310, 331.4; 428/423.3, 423.7; 52/208; 525/440; 528/60

[56] References Cited

U.S. PATENT DOCUMENTS

| | | | |
|---|---|---|---|
| 3,415,701 | 12/1968 | Haldane et al. | 156/331.4 |
| 3,416,833 | 12/1968 | Griffin | 52/208 |
| 3,459,584 | 8/1969 | Caldwell | 428/423.7 |
| 3,779,794 | 12/1973 | de Santis | 156/331.4 |
| 4,224,376 | 9/1980 | Ishige et al. | 156/331.4 |

Primary Examiner—John J. Gallagher
Attorney, Agent, or Firm—Mary E. Picken

[57] ABSTRACT

The process of this invention uses a single primer and a fast curing two component adhesive sealant to adhere automotive glass surfaces to coated metal surfaces.

6 Claims, No Drawings

PRIMER AND SEALANT FOR GLASS AND COATED METAL

It is not difficult to attach two rough surfaces to each other using an adhesive sealant; any surface roughness simplifies and advances the attachment by assisting the adhesion of the sealant to the surface. However, the attachment of two smooth surfaces to each other presents a real challenge; the sealant must first adhere to the smooth surfaces before two such surfaces can be attached. The installation of stationary glass windows in automobiles requires such an adhesion of smooth glass window surfaces to smooth painted metal surfaces.

It is also difficult to adhere parts in a moving assembly line system when there is limited time to accomplish the installation. A further problem is created by the need to have strong sealant bonds between metal and glass formed immediately so that the fully assembled car can be driven away from the line. In order to be useful a sealant must meet a number of demanding performance criteria.

The installation of stationary glass in automobile and truck assembly lines usually requires two different primers as well as an adhesive or sealant. One primer is used on the glass to promote adhesion of the sealant to the glass, the second primer is used on the painted metal surface to promote adhesion of the sealant to the painted metal surface. Conventional sealants are one component moisture cured materials which cure slowly at ambient temperatures. In an assembly line it is inconvenient to use multiple primers and it is time consuming to wait for slow curing sealants to cure.

OBJECT OF THE INVENTION

It is accordingly the object of this invention to provide a single primer for use on both glass surfaces and painted metal surfaces and to provide a sealant for use with this single primer which cures rapidly at ambient temperatures.

SUMMARY OF THE INVENTION

In accordance with the present invention a process is provided in which a single primer is used for both glass surfaces and painted metal surfaces and in which a sealant is used which cures rapidly at ambient temperatures. This invention is a method for joining and sealing a clear coated metal surface to a glass surface which comprises (a) applying a primer to said metal surface and said glass surface, said primer comprising a dispersion of 10 to 20 weight parts of a linear polyester resin, 4 to 5 weight parts of a polyisocyanate crosslinking agent, 3 to 9 weight parts of carbon black and 66 to 83 weight parts of a volatile organic solvent; (b) applying a sealant to either said primed glass surface or said primed clear coated metal surface, said sealant comprising a mixture of: (1) a prepolymer comprising a polyethylene oxide polypropylene oxide ether diol and diphenyl methane diisocyanate which prepolymer has 3 to 15 percent free isocyanate groups; and (2) a curative comprising 20 to 40 weight parts of polyethylene oxide polypropylene oxide ether diol, 20 to 40 weight parts of a polyethylene oxide polypropylene oxide ether triol, 15 to 60 parts by weight filler, 0.5 to 1.5 parts diamine, and catalytic amounts of an organotin catalyst, the weight ratio of said prepolymer to said curative ranging from 1:1 to 1:2; and (c) joining the metal and glass prepared in steps (a) and (b).

Advantages of the present invention include the use of a single primer for both glass surfaces and painted metal surfaces. This facilitates assembly line use in comparison to the conventional use of separate primers for different surfaces. Another advantage of the present invention is that the sealant is easily applied and does not sag, yet the low viscosity permits gravity flow of the sealant. Yet another major advantage of the present invention is the rapid cure of the sealant. The adhesive strength of the sealant develops so rapidly that parts adhered with the sealant are designed to pass the federal motor vehicle safety standards (MVSS 212) Crash Barrier test after one hour. This means that cars may be taken directly off the automobile assembly line one hour after the windows have been installed using the primer and sealant of this invention. These and other advantages will become readily apparent to those skilled in the art based upon the disclosure contained herein.

DESCRIPTION OF THE PREFERRED EMBODIMENTS

In a preferred embodiment the surface primer of this invention comprises a dispersion of 10 to 20 parts linear polyester resin, 4 to 5 parts polyisocyanate crosslinking agent, 3 to 9 parts carbon black, and 66 to 83 parts volatile solvent.

Conventional primers may contain silane compounds as described in U.S. Pat. No. 3,707,521 and U.S. Pat. No. 3,779,794. Both patents suggest the silane component is necessary to improve the bond between sealant and glass or metal, the silane-containing primer having affinity for both glass or metal and the sealant. The primer of this invention contains no silane.

The first ingredient of the primer of this invention is a linear polyester resin having a molecular weight from 15,000 to 25,000 and is an aromatic diacid/glycol linear polyester resin having a glass transition temperature of 67 degrees Centigrade. The preferred linear polyester resin has a molecular weight of 20,000, however the molecular weight of the resin is not critical to operability. The preferred linear polyester resin, Vitel PE-200 resin from The Goodyear Tire and Rubber Company, Akron, Ohio, has a maximum carboxyl number of 50 equivalents per $10^6$ grams and a ring and ball softening point at 0° C. of 150 to 160.

The next ingredient of the primer of this invention is the polyisocyanate crosslinking agent. Among the useful polyisocyanates are 4,4',4"-triphenylmethane triisocyanate, polymethylene polyphenyl isocyanate, tris (p-isocyanoto-phenyl)- thiophosphate and polycarbodiimide adducts of 4,4'-diphenyl-methane diisocyanate such as Isonate 143L. Mixtures of polyisocyanates are also useful in the primer. The preferred polyisocyanate crosslinking agent is tris(p-isocyanato-phenyl)-thiophosphate which is available as Desmodur RF polyisocyanate solution from Mobay Chemical Corporation, Pittsburgh, Pa.

Another ingredient in the primer of this invention is a volatile solvent blend. Among the useful solvents are xylene, methylene chloride, benzene, monochlorobenzene, trichloroethylene, ethylene dichloride, toluene, and perchloroethylene. The preferred solvents are a mixture of toluene, monochlorobenzene and methylene chloride.

Carbon black is added to the primer to increase resistance to ultraviolet light. United N110 carbon black available from Ashland Chemical Company, Columbus, Ohio is among the carbon blacks suitable for use in the primer of this invention. Small amounts of a filler such as talc, are an optional ingredient, one such talc being Mistron talc available from Cyprus Industrial Materials Company, Los Angeles, California.

The sealant of this invention is a mixture of a prepolymer component and a curative component. In a preferred embodiment the prepolymer component of the sealant of this invention comprises 40 to 60 parts polyethylene oxide polypropylene oxide ether diol, 20 to 25 parts diphenylmethane diisocyanate and 20 to 30 parts filler. The curative component of the sealant of this invention comprises 20 to 40 parts polyethylene oxide polypropylene oxide ether diol, 20 to 40 parts polyethylene oxide polypropylene oxide ether triol, 10 to 60 parts filler, 0.2 to 1.0 parts silica, 0.2 to 1.0 parts carbon black paste, 0.5 to 1.2 parts piperazine and 0.05 to 1.0 parts dibutyltin dialkyl acid catalyst.

The prepolymer component of the sealant of this invention is made as described in U.S. Pat. No. 4,552,934 where about 100 parts of an active hydrogen containing material having a molecular weight of 700 to 4500 and preferably from about 1000 to 3500 is reacted with 30 to 120 parts of an organic polyisocyanate. Usually the reaction time at elevated temperature is chosen to give a prepolymer in one to several hours. These prepolymers usually have from 2 to 7 percent free isocyanate with 4 to 5 percent free isocyanate being preferred.

The active hydrogen containing material in the prepolymer component of the sealant may be 700 to 4,000 molecular weight polypropylene diol, polyethylene oxide polypropylene oxide diol, polytetra-methylene ether diol, polyepsilon caprolactive diol or polybutadiene diol, or mixtures of these diols. The preferred active hydrogen containing material is a polyethylene oxide polypropylene oxide ether diol of 2000 molecular weight, one such suitable material being the Poly-G 55–56 polyol available from Olin Chemicals, Stamford, Connecticut.

The second ingredient of the prepolymer component of the sealant of this invention is the organic polyisocyanate. Among the useful organic polyisocyanates are: polymethylene polyphenyl isocyanate, 2,4-toluene diisocyanate, 2,4-2,6 (80/20) toluene diisocyanate, 4,4'-diphenylmethane diisocyanate, 1,4-phenylene diisocyanate, polycarbodiimide adducts of 4, 4'-diphenylmethane diisocyanate, 1,4-phenylene diisocyanate, 3,3'-dimethoxy -4,4'-biphenyl diisocyanate, 3,3'-dimethyl-4,4'-biphenyl diisocyanate, 3,3'-dimethyl-4,4'-diphenyl methane diisocyanate, or mixtures of these diisocyanates. The preferred organic polyisocyanate is a modified diphenyl methane diisocyanate available as Isonate 143L from Upjohn Polymer Chemicals, La Porte, Texas. This modified diphenyl methane diisocyanate contains a high percentage of pure diphenylmethane diisocyanate and a lesser amount of polycarbodiimide adducts.

The last ingredient of the prepolymer component of the sealant of this invention is an optional filler. Representative examples of inert powdery fillers are: aluminum silicates, carbon black, talcs (magnesium silicates), calcium carbonate, calcium silicates, barium sulfates, graphite, or mixtures of fillers. The preferred filler ingredient is talc which is available as dry Mistron RCS talc from Cyprus Industrial Minerals Company, Los Angeles, Calif.

The curative component of the sealant of this invention is a mixture of active hydrogen containing materials of different molecular weights, an optional filler, a diamine, an organotin catalyst, and an optional thickening agent.

The first ingredient of the curative component of the sealant is a polyether diol having from 70 to 88 percent primary hydroxyls and a molecular weight of from 700 to 4000. An average molecular weight of 3000 is preferred. Other suitable active hydrogen containing materials include: polypropylene oxide diol, polyethylene oxide propylene oxide diol, polytetramethylene ether diol and mixtures of diols. The preferred polyether diol is polyethylene oxide polypropylene oxide ether diol known as Poly-G 55-37 polyol available from Olin Chemicals, Stamford, Conn.

The second ingredient of the curative is a polyether triol having from 70 to 88 percent primary hydroxyls and a molecular weight from 700 to 6500. A molecular weight of about 4,500 is preferred. Suitable active hydrogen containing materials include: polypropylene oxide triol, polyethylene oxide propylene oxide triol and mixtures of triols. The preferred polyether triol is polyethylene oxide polypropylene oxide ether triol known as Poly-G 85-36 polyol available from Olin Chemicals, Stamford, Conn.

The third ingredient of the curative component of the sealant of this invention is an optional filler. Representative examples of suitable inert powdery fillers are: aluminum silicates, carbon black, talcs (magnesium silicates), calcium carbonate, calcium silicates, barium sulfates, graphite, and mixtures of fillers. The preferred filler ingredient is talc which is available as Mistron RCS talc from Cyprus Industrial Minerals Company, Los Angeles, Calif.

The fourth ingredient of the curative component is a diamine. Suitable diamines include: m-phenylene diamine, 4, 4'-methylene dianiline, 4, 4'-diaminodiphenylsulfone, piperazine, 2, 6-diamino-pyridine, p, p'-methylene bis (orthochloroaniline), amino ethyl piperazine, isophoronediamine, diethyltoluene diamine, ethylene diamine, 1, 3 diaminopropane and mixtures of these organic diamines. The preferred diamine is piperazine which is available as anhydrous piperazine from Texaco Chemical Co., Houston, Tex. From 0.5 to 1.5 parts diamine are used in 100 parts curative.

The fifth ingredient of the curative component is a metallic catalyst. Suitable catalysts for the reaction between active hydrogen containing compounds and isocyanates include: dibutyltin dilaurate, dibutyltin diacetate, ferric acetyl acetonate, nickel acetylacetonate, dibutyltin dialkyl acid, stannous octoate, dibutyltin di-iso-octyl mercapto acetate, and mixtures of organometallic catalysts. The preferred organo metallic catalyst is the dibutyltin dialkyl acid catalyst known as Dabco 125 available from Air Products, Allentown, Pa. Conventional catalytic amounts of organotin catalyst are used in the curative component.

The preferred optional thickening agent is fumed silica available as Aerosil 200 fumed silica from Degussa Inc., New York, N.Y.

The prepolymer component is mixed with the curative component to make the sealant of this invention using a prepolymer: curative ratio of from 1:1 to 1:2. The preferred ratio is 1:1.5. The sealant is applied by extruding a triangular shaped bead of sealant from a static mixing wand which is part of a meter-mix dispensing unit, the coating thickness is preferably about 6 mm.

The nature and advantage of this invention can be more readily seen and appreciated by reference to the following representative examples where all parts and percentages are by weight unless otherwise indicated. Also, all references cited herein are expressly incorporated herein by reference.

EXAMPLE 1

The surface primer was made by adding to a round pint can a linear polyester resin in the amount of 30 grams (Goodyear Tire and Rubber Company, Akron, Ohio VITEL PE-200 resin having a molecular weight of about 20,000 a glass transition temperature of 67±2 degrees Centigrade, a carboxyl number of 50 eg/$10^6$ grams, and a ring and ball softening point of 155±5 at 0° Centigrade, reagent grade toluene in the amount of 20 grams, monochlorobenzene in the amount of 74 grams, methylene chloride in the amount of 10 grams, 45 grams of Desmodur RF polyisocyanate (Mobay Chemical Corporation, Pittsburgh, Pa.), which is a 20% solution of tris (p-isocyanato-phenyl)-thiophosphate in methylene chloride, 12 grams United N110 carbon black (Ashland Chemical Company, Columbus, Ohio), and 9 grams dry Mistron talc (Cyprus Industrial Minerals Company, Los Angeles, Calif.).

Ten ceramic balls were added. The can was put under nitrogen atmosphere and sealed. The can was rolled for 18 hours on a can roller. The materials appeared well dispersed. This black primer having 30% solids had a 125 centipoise viscosity at 25° C.

EXAMPLE 2

The prepolymer component of the sealant was made by adding, with a nitrogen purge, 52 parts of polyethylene oxide polypropylene oxide ether diol of 2000 molecular weight (Olin Poly-G 55-56 polyol, Olin Chemicals, Stamford, Conn.), followed by 25 parts dry Mistron RCS talc (Cyprus Industrial Minerals Company, Los Angeles, California) with stirring and heating at 60° to 66° C. The wetted mix was sheared at high speed for 30 minutes. The temperature was then stabilized at 60° C. and 23 parts of Isonate 143L modified diphenyl methane diisocyanate (Upjohn Polymer Chemicals, La Porte, Tex.) were added with rapid stirring. The reaction was allowed to proceed for one hour at 66° C. followed by one hour of vacuum at 26 inches mercury (30 inches mercury being full vacuum on the production gauge). The finished product was transferred to a bucket and sealed under a nitrogen atmosphere. The free isocyanate content of the prepolymer was measured and determined to be 4.46%; the viscosity was 23,250 centipoise at 25° C.

EXAMPLE 3

The curative component of the sealant was prepared by charging 30.5 parts polyethylene oxide polypropylene oxide ether diol of 3000 molecular weight (Olin Poly-G 55-37 polyol, Olin Chemicals, Stamford, Conn.) and 30 parts polyethylene oxide polypropylene oxide ether triol of 4500 molecular weight (Olin Poly-G 85-36 polyol) to a reactor fitted with a lid, stirrer and degassing outlet. The polyols were heated to 100° C. with stirring. Mistron RCS talc in the amount of 38 parts, Aerosil 200 silica (Degussa, Inc., New York, N.Y.) in the amount of 0.50 parts, and 0.59 parts Stantone HCC-3906 carbon black paste (Harwick Chemical Corporation, Akron, Ohio) were added in order; allowing time for each material to be dispersed uniformly in the mix. The mixture was degassed at 3 mm mercury for two hours. Anhydrous piperazine in the amount of 0.84 parts (Texaco Chemical Co., Houston, Tex.) and dibutyltin dialkyl acid catalyst (Dabco 125, Air Products, Allentown, PA) in the amount of 0.10 parts were added. The temperature was adjusted to 80° C. and the product was degassed for an additional 12 minutes. The curative component of the sealant had a viscosity of 15,600 centipoise at 25° C.

EXAMPLE 4

The primer of Example 1 was used on various substrates, allowed to dry, and then the prepolymer of Example 2 was used along with the curative of Example 3 to prepare a sealant which had excellent physical properties as described in detail in this Example 4.

4A: Glass and phenolic primed metal surface.

The black fritted end of tempered glass (simulating windshield glass) was first wiped with isopropanol and allowed to dry. The primer of Example 1 was brushed across the fritted glass and allowed to dry. A phenolic primed piece of steel was wiped with isopropanol and allowed to dry. The prepolymer of Example 2 was mixed with the curative of Example 3 in a 1:1.5 ratio to make an adhesive sealant which was applied as a bead to the primed fritted glass. The steel piece was overlapped on the primed glass to make a cross bonded laminate in which the sealant had a 6 mm thickness. After curing for 1 hour at room temperature a lapshear sample was tested on an Instron machine using a 5 in/minute crosshead speed. The adhesive failed cohesively at 72 psi. After curing for 3 days at room temperature a lapshear sample tested on an Instron machine failed cohesively at 418 psi.

4B: Clear coated metal surface and phenolic primed metal surfaces.

A piece of painted steel coated with clear enamel (referred to herein as a 'clear coated metal surface' or as 'clear coated steel') was wiped with isopropanol and allowed to dry. The primer of Example 1 was brushed across the clear coated steel and allowed to dry. A second piece of steel coated with a phenolic based primer was wiped with isopropanol and allowed to dry. The prepolymer of Example 2 was mixed with the curative of Example 3 in a 1:1.5 ratio to make an adhesive sealant which was applied as a bead to the primed clear coated steel. The second phenolic primed steel piece was overlapped to make cross bonded laminates in which the sealant had a 6 mm thickness. After curing for 1 hour at room temperature a lapshear sample was tested on an Instron machine using a 5 in/minute crosshead speed; the adhesive failed cohesively at 41 psi. After curing at room temperature for 3 days a lapshear sample was tested on an Instron machine using a 5 in/minute crosshead speed. The adhesive sealant failed cohesively at 355 psi.

EXAMPLE 5

5. Glass and clear coated metal surface

The black fritted end of a tempered glass piece was first wiped with isopropanol and allowed to dry. The primer of Example 1 was brushed across the fritted glass and allowed to dry. A piece of painted steel coated with clear enamel was wiped with isopropanol and allowed to dry. The primer of Example 1 was brushed across the coated steel and allowed to dry.

The prepolymer of Example 2 was mixed with the curative of Example 3 in a 1:1.5 ratio (by weight) to make an adhesive sealant which was applied as a bead to the primed clear coated steel. The primed glass piece was then overlapped to make cross bonded laminates in which the sealant had a 6 mm thickness. After curing for 1 hour at room temperature a lapshear sample was tested on an Instron machine using a 5 in/minute crosshead speed; the adhesive failed cohesively at 52 psi. After curing at room temperature for 3 days a lapshear sample was tested on an Instron machine using 5 inch/minute crosshead speed. The adhesive sealant failed cohesively at 197 psi.

We claim:

1. A method for joining and sealing a coated metal surface to a glass surface which comprises:
   (a) applying a primer to said metal surface and said glass surface, said primer comprising a dispersion of 10 to 20 parts by weight of a linear polyester resin, 4 to 5 parts by weight of a polyisocyanate cross-linking agent, 3 to 9 parts by weight of carbon black, and 66 to 83 parts by weight of a volatile organic solvent;
   (b) applying a sealant to either said primed glass surface or said primed coated metal surface, said sealant comprising a mixture of:
      (1) a prepolymer comprising a polyethylene oxide polypropylene oxide ether diol and diphenyl methane diisocyanate which has 3 to 15 percent free isocyanate groups; and
      (2) a curative comprising 20 to 40 parts by weight polyethylene oxide polypropylene oxide ether diol, 20 to 40 parts by weight polyethylene oxide polypropylene oxide ether triol, 15 to 60 parts by weight filler, 0.5 to 1.5 parts by weight diamine and catalytic amounts of an organotin catalyst, the weight ratio of said prepolymer to said curative ranging from 1:1 to 1:2, and
   (c) joining the metal and glass prepared in steps (a) and (b).

2. The method of claim 1 wherein the prepolymer of step (b) comprises 40 to 60 parts polyethylene oxide polypropylene oxide ether diol, from 20 to 25 parts diphenyl methane diisocyanate and 15 to 40 parts filler.

3. The method of claim 2 wherein said primer comprises a dispersion of 15 parts linear polyester resin, 5 parts polyisocyanate, 6 parts carbon black and 74 parts volatile organic solvent, said prepolymer comprises 50 parts polyethylene oxide polypropylene oxide ether diol, 25 parts diphenyl methane diisocyanate and 25 parts filler and said curative comprises 30 parts polyethylene oxide polypropylene oxide ether diol, 30 parts polyethylene oxide polypropylene oxide ether triol, 0.8 parts piperazine, 0.1 parts dibutyltin dialkyl acid catalyst and 39.1 parts talc filler.

4. The method of claim 1 wherein the polyisocyanate crosslinking agent of step (a) is tris(p-isocyanatophenyl)-thiophosphate.

5. The method of claim 1 wherein said coated metal surface is a clear enamel coated metal surface.

6. The method of claim 1 wherein said coated metal surface is a phenolic primer coated metal surface.

* * * * *